April 21, 1959 F. H. IRELAND 2,883,652
COMBINATION PUSHBUTTON CONTROL AND MULTIPLE INDICATOR
Filed July 31, 1957 2 Sheets-Sheet 1
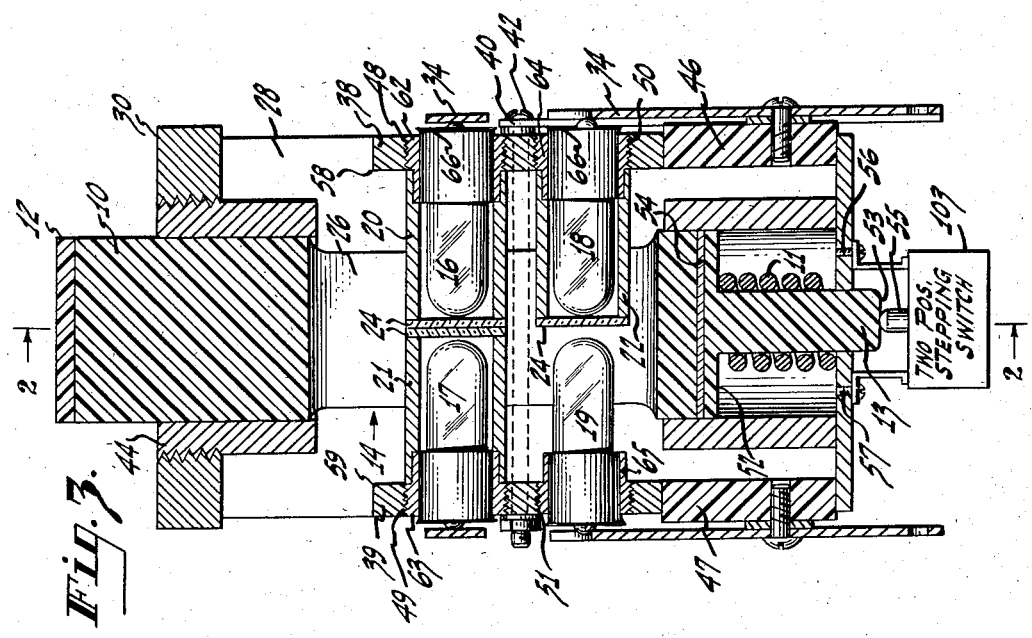
INVENTOR.
FRED H. IRELAND

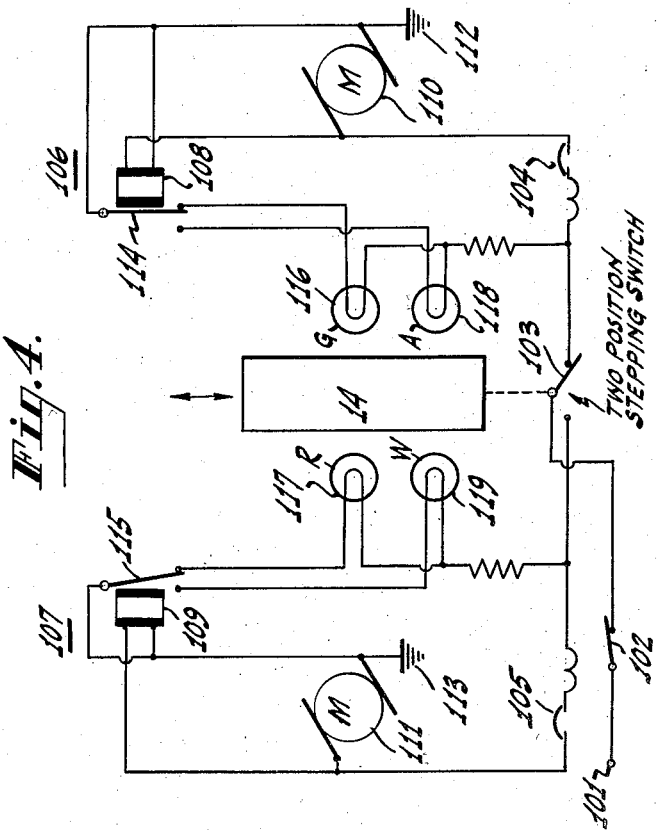
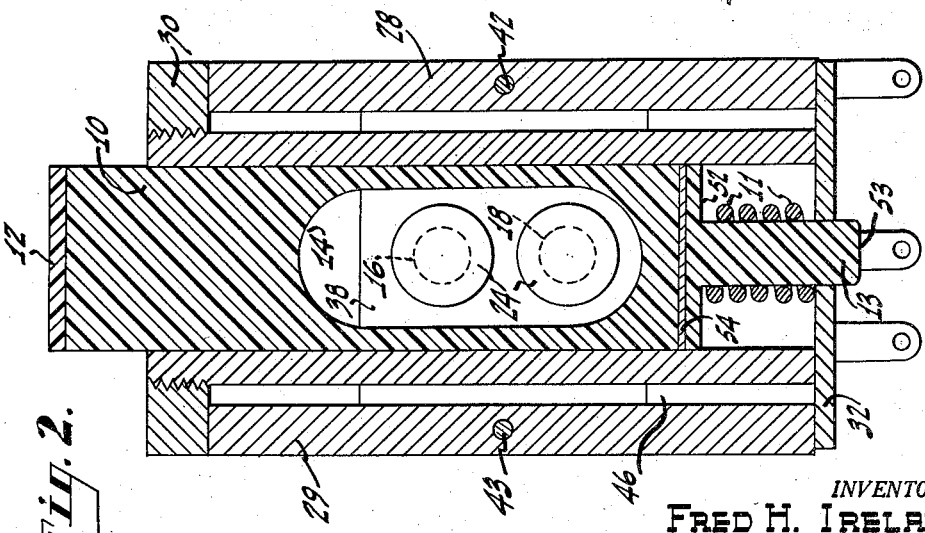

United States Patent Office 2,883,652
Patented Apr. 21, 1959

2,883,652

COMBINATION PUSHBUTTON CONTROL AND MULTIPLE INDICATOR

Fred H. Ireland, Moorestown, N.J., assignor to the United States of America as represented by the Secretary of the Navy Application July 31, 1957, Serial No. 675,505

1 Claim. (Cl. 340—252)

The present invention relates to a combination pushbutton control and multiple color indicator and more particularly relates to a mechanism for visual indication of main component failure combined with a means for introducing an auxiliary component therefor and a reset apparatus for reinsertion of the main component when repaired.

Control consoles for elaborate systems may involve a multiplicity of manually operated devices, such as pushbutton switches, and a multiplicity of condition indicators, such as indicator lights. This means that the console display is at best rather complex. The present invention reduces that complexity by making the pushbuttons serve not only as switch controls, but also as indicator lights. The lights of various colors which cause the translucent pushbuttons of this invention to glow will display conditions related to, or even controlled by, such pushbuttons. To be most effective in reducing the complexity of the console face it was necessary to devise a combination pushbutton switch unit and indicator light which is highly compact, and of course highly reliable.

In this invention a transparent pushbutton with a translucent top is used. A plurality of lamps, capable of illumination in different colors, are positioned inside the general outline of the pushbutton to uniformly light up its entire translucent top, but they are not mounted on the pushbutton; they are fixedly mounted on the casing of the pushbutton unit and hence will not be jarred if the pushbutton is thrust in abruptly.

A control console may govern operations which on occasion become both complex and urgent. It can thus be of critical importance to have controls and indicators so rugged that a harried operator can effect commands by literally punching the controls or administering a quick jab, so reliably contrived that this sort of handling will not impair operativeness as by jarring delicate filaments, and so expediently designed that condition indicators are integrally associated with the controls they relate to.

Accordingly, an object of the present invention is to provide a combination control and indicator means which will provide for maximum economy of space and minimum cost of a console while presenting a simplified console display and wherein both switchover and display functions for a single structural unit may be effected by a single device.

Another aim of the invention is to provide a combination control and indicator means in a single device relative simplicity which will provide facility of visual detection of equipment failure together with a means of readily correcting such failure.

Another purpose of the invention is to provide a transparent or semitransparent control mechanism incorporating a plurality of illuminating devices to provide display indication of equipment condition wherein the illuminating devices are positioned or mounted so as not to be jarred on operation of the control mechanism regardless of the urgency or abruptness of such operation and wherein the control mechanism and illuminating devices will be rugged so as to withstand urgent rough operator handling.

Still another object of the invention is to provide condition indicators integrally associated with control mechanisms so as to combine ruggedness, reliability, economy of panel space and of fabrication and rapidity of detection and of operation in equipment designed for emergency usage such as would occur under combat conditions.

Other objects and many of the attendant advantages of this invention will be readily appreciated as the same becomes better understood by reference to the following detailed description when considered in connection with the accompanying drawings wherein:

Fig. 1 is a front elevation of the pushbutton unit showing the positioning of the pushbutton, terminals, and casing structure;

Fig. 2 is a longitudinal mid-sectional view, seen from the front side of Fig. 1, taken on the lines 2—2 of Fig. 3 and showing the pushbutton with its cut out slot for lamps and their encircling filters, the inner ends of the filters being seen in this view;

Fig. 3 is a longitudinal section of the pushbutton assembly, taken on the line 3—3 of Fig. 1; and Fig. 4 is a circuit diagram illustrative of the invention.

The device shown involves a pushbutton, an elongated slot in the pushbutton, a casing in which the pushbutton slides, and lamps mounted on the casing and projecting into the slot; they do not move with the pushbutton but can light up the top end of the pushbutton whether it be in its "in" position or its "out" position.

The cylindrical pushbutton 10, as seen for example in Figure 2, is made of clear Lucite, or other transparent plastic or glass, moulded or machined and polished. A translucent (milky white) plastic disk 12 is laminated to the top end of the pushbutton. Or alternatively, the end of the transparent rod may be etched, sandblasted or otherwise coated or roughened to produce a translucent target. A slot 14, wider than each lamp and filter unit is cut through the diameter of the rod to allow the lamps and filters to be positioned inside the general outline of the pushbutton. At the bottom end of the pushbutton 10 there is located a plastic plunger 13 having the general configuration of a collar button. A spring 11 surrounds the plunger, bearing against its shoulder 52, to supply the force necessary to return the pushbutton to its up position.

The pushbutton slides axially in a sleeve which is part of a casing described later herein. That casing has fastened to its bottom end a push-type, two-position momentary contact or stepping switch 103, of conventional design. The bottom end 53 of the plunger 13 bears against the small pushrod 55 of the switch 103. If the device is used with a stepping switch, the latter is thrown over from rest position in either of its settings to rest position in its other setting by a single push, the pushrod and pushbutton thereupon being returned to "up" position by the spring surrounding the plunger 13.

A plurality of lamps (best seen in Figure 3) are positioned within the slot 14 of the pushbutton 10. These are miniature lamps preferably of standard commercial design about one quarter inch in diameter. In the embodiment shown, there are four of these lamps, 16, 17, 18, and 19. Each lamp is surrounded by a different color cylindrical filter made of plastic or other suitable material (one filter may be deleted to produce essentially white light). Lamp and filter units are mounted in fixed position on the casing 60, projecting radially into the slot 14 of the pushbutton. That slot is elongated enough for the pushbutton to move up and down without touching the lamp filters. Two lamps extend inward radially from one side of the slot, and two from the other side. All four lie in essentially the same plane, one pair being positioned in opposition to the other pair within the slot. The distance between the translucent end disk 12 and the nearest lamps, that is, the upper ones, is greater than the diameter of the pushbutton rod in order to give a well-diffused illumination of the top face of the pushbutton.

Three of the four lamps may be surrounded by small cylindrical filters 20, 21, and 22 respectively, of different colors, and a fourth lamp without filter may be used to give a white light. The two lamps near the top of the pushbutton may have respectively a red and a green filter. One lamp on the lower level may have an amber filter, and the other lamp may shine without a filter. Opaque light barriers 24 (Figures 2 and 3) are cemented to the inner ends of the filters to prevent contamination of colors. If a longer pushbutton rod is used, with a more extended slot, it is possible to add more lamps and filters, and thus more color indications in addition to the red, green, amber or yellow, and white indications herein-before described. Each of the multiple colors uniformly lights the whole button surface area.

The light from any one of three of the lamps housed in the pushbutton first passes through a colored plastic filter. Due to the good light conducting properties of the clear Lucite and because of internal reflections occurring within the button, much of the filtered light is directed upward to the milky white diffusing disk 12 which then presents an evenly illuminated surface. In the case of each lamp located on the lower level, sufficient light from its output is channeled upward through the Lucite side walls 26 surrounding the lamps to result in a button illumination that is approximately equal to that resulting from the illumination given by either of the top lamps. Some light values obtained in practice are: green, 24 foot lamberts; red, 37 foot lamberts; and amber, 43 foot lamberts. The brightness of this illuminated pushbutton is adequate to give a clearly discernible signal in ambient illumination of up to 20 or 30 foot candles. Its brightness may be increased by incorporaing a mirror surface at the lower end of the pushbutton rod as at 54. This may be done by metallizing the end of the plastic rod. With the arrangement described, little or no unwanted mixing of the colors occurs; any of the four colors appears pure and clearly distinguishable from the others. (This does not preclude purposely having two colors on to give a blended result when more elaborate combination indications are needed.)

It will be appreciated that space requirements are stringent in complex consoles such as those for which this unit is intended. The casing of the unit, previously referred to briefly, is designed to that end.

A tubular sleeve member 44 encloses and guides the pushbutton 10 and the plunger 13. The sleeve member 44 is cut out on its opposite sides, exposing the open sides of the slot 14 in pushbutton 10. In the embodiment shown, about a half-inch of the pushbutton protrudes from the upper end of the sleeve in upward position of the pushbutton so the end of the pushbutton may protrude from the console panel by somewhat more than the length of its stroke.

The top end of sleeve 44 is threaded, and screwed into a top cap 30. That top cap 30 bridges and is screwed into a position abutting side walls 28, 29 which walls are of insulating material. At the bottom these side walls are bridged by a bottom cap 32, which is centrally bored to receive the lower end 53 of the plunger 13. Tapped holes 56, 57 are provided in the bottom cap for fastening thereto the stepping switch 103.

The side walls are further bridged by front and back plates 38, 39 and terminal boards 46, 47. The front and back plates are of brass, and serve not only to complete the rigid unitary structure, but also to hold the lamps 16, 17, 18, 19, and to provide conductive paths in the light bulb circuit. The side walls 28, 29 have shallow rectangular recesses 58, 59 which position the front and back plates and terminal boards. Holding bolts 42, 43 pass through the front and back plates 38, 39 and the side walls 28, 29 to hold them solidly together and also to connect the front and back plates electrically.

Tapped holes 48, 49, 50, 51 in the front and back plates 38, 39 receive the threaded ends of cylindrical metal adaptors 62, 63, 64, 65 for the lamp bulbs. Attached to the inner ends of three of these adaptors 62, 63, 64 are the three colored filters 20, 21, 22 which are held in place thereby as they project into the pushbutton slot 14. All four lamps fit into the adaptors 62, 63, 64, 65, the lamp heads being thereby positioned within their respective filters and within the pushbutton slot. A projecting collar 66 at the base of each lamp butts against the end of the adaptor, and thus removably positions the lamp. The metal shank of the lamp fits snugly in the metal adaptor and thus is electrically connected to the brass front or back plate that supports it.

The lamps have the conventional electrode arrangement for their filaments, the shank of the lamp constituting one electrode and the other electrode projecting at the center of the base. It will be observed that the shank electrodes of all the lamps are electrically connected together, by their contact through the metal adaptors, to the front and back plates which are electrically joined by the bolts 42, 43. The common return, or ground, for the shank electrode side of all the lamps is provided by terminal strip 40, which is connected to brass plate 38 and provides a ground connector terminal at its lower end.

Terminal boards 46, 47 fit in the lower part of the recesses 58, 59 of the side walls 28, 29. Their top edges butt against the front and back face plates 38, 39. These terminal boards are made of insulating material and are bolted together through the side members. These insulating terminal boards carry terminal contactors 34 screwed or otherwise pivotally fastened to them. The terminal contactors 34 are made of springy metal. Thus they can be swung to the side for replacement of lamps, and swung back both to resiliently hold the lamps in place and to make contact with their base electrodes. The top ends of the terminal strips are notched to hold them more securely in position at the base of the lamps. The bottom ends of the terminal strips serve as connectors to the various circuits feeding the lamps.

Figure 4 shows one type of circuit arrangement with which this pushbutton unit may be used. Here the lights in the pushbutton will indicate the conditions of a circuit which involves two motors, a primary motor and a standby motor. The pushbutton controls the two-position stepping switch. If it is thrown to cut in the primary motor, a green light in the pushbutton will show that the primary motor circuit is functioning, or an amber light will show circuit trouble there. When the pushbutton is pressed to cut in the standby motor in place of the primary motor, a white light will show its circuit functioning or a red light will show trouble in that circuit.

The circuit which accomplishes this includes an input terminal 101 to which the electric power is brought. A line switch 102 enables the entire circuit to be activated when the equipment is put into use. The two-position stepping switch 103 is thrown from one position to its other position each time the pushbutton 14 is pressed down. As seen in Figure 4, this switch is presently thrown to the right, to close the circuit through circuit breaker 104 to the primary motor 110 and on to ground 112. A relay 106 has its magnetic core 108 connected in parallel with the circuit breaker and primary motor 110. The armature 114 of the relay is connected in circuit with the green and amber lamps in such polarity as to complete a connection to ground 112 from the green lamp 116 when the relay core is energized and to complete a connection to ground 112 from the amber lamp 118 when the relay core is de-energized. In a like manner, the standby motor 111 has a relay 107 connected in parallel therewith, the armature 115 of its magnetic core 109 being connected in circuit with the white and red lights. When the magnetic core 109 is energized, a connection to ground is completed through the white light 119; when the magnetic core 109 is de-energized, a connection to ground is completed through the red light 117. With any mechanical or electrical failure in the primary motor circuit causing voltage overload at the circuit breaker 104 it will break the circuit and cause the relay to change the indicator light from green to amber. Similarly, when the standby motor is cut in, overload will cause the circuit breaker 105 to break the circuit and thus effect change of the indicator light from white to red.

Thus it will be seen that, with the line switch closed and the stepping switch thrown to the right, if the primary motor circuit is functioning properly a green light will show in the pushbutton. If a failure in that circuit occurs, the light will change from green to amber. The operator then presses the pushbutton. This cuts out the primary motor circuit and cuts in the secondary motor circuit. Now the condition of this circuit is automatically indicated by the light showing in the pushbutton: white if operative, red if inoperative.

In operation, assume a case where the primary motor circuit failed and the signal light so indicated. The operator pressed the pushbutton and transferred to the standby motor. If now the primary motor circuit is repaired, the operator need only press the pushbutton again to revert to use of the primary motor, with its indicator lights automatically coming into play at the same time.

While the invention has been shown as applied to a particular circuit to illustrate its use, it will be appreciated that the pushbutton assembly of this invention may be used under any circumstances where it is desired to combine a pushbutton control and an indicator of related conditions. Its use is not limited to indicating whether a circuit is functioning or not; it may for example, be arranged to indicate whether a given level of voltage or current is exceeded. Moreover, its use is not limited to having one lamp on and one off or vice versa; it may be arranged to have both on at the same time to give a mixed color light indication representative of for example an intermediate voltage level. When the mixed colors constitute a discrete condition indicator, the freedom from unwanted color mixing when a single light is on is especially appreciated. Again, while the invention has been shown as having any light steady-on or steady-off, it is not so limited; the pushbutton assembly of the present invention is equally well adapted to be used with circuits which give flashing or pulsating light indications, or combination of pulsation and color.

It will be observed that the flat area of the top end of the pushbutton is adapted for inscribing, or indicia inlay, if desired, to identify the conditions related to any particular pushbutton. The structural arrangement of this invention permits use of conventional small lamp bulbs, protects them from shock, and permits them to be readily replaced. Positioning the lamps inside the general outline of the cylindrical Lucite pushbutton makes at once for optical efficiency and mechanical simplicity.

Obviously many modifications and variations of the present invention are possible in the light of the above teachings. It is therefore to be understood that within the scope of the appended claim the invention may be practiced otherwise than is specifically described.

What is claimed is:

A pushbutton control and indicator assembly comprising a casing, top and bottom end caps for said casing, a push-type switch secured to said bottom end cap and having a pushrod actuating member, a sleeve extending within said casing from one end cap to the other end cap and secured therebetween, said sleeve being cut out on opposite sides to expose the interior thereof, a light-transmitting pushbutton slideably supported within said sleeve and having an elongated slot therein in registry with the cutout portion of said sleeve, a plurality of indicator lamps of different color characteristics positioned to extend through the cutout portion of said sleeve and into the slot of said pushbutton so that the filaments of each lamp will transmit light through an arc of substantially 360° into said light-transmitting pushbutton, each of said lamps having a shank electrode and a base electrode, a metal adaptor for securing and electrically connecting the shank electrode of each lamp to said casing, resilient terminal contactors biased into engagement with the base electrodes of said lamps to maintain the lamps in position and serve as electrical connectors to circuits feeding the lamps, a minor surface on the lower end portion of the pushbutton, a plunger rod having a shoulder at the upper end thereof and secured at the shoulder to the bottom end of the pushbutton and extending through said bottom end cap of the casing into engagement with the pushrod of said switch thereby to actuate the switch in response to depression of said pushbutton, and a spring surrounding said plunger and disposed in compression between said shoulder and said bottom end cap thereby to return the plunger rod and the pushbutton secured thereto to their normal position after momentarily being depressed.

References Cited in the file of this patent

UNITED STATES PATENTS

| | | |
|---|---|---|
| 2,203,309 | Schmid | June 4, 1940 |
| 2,217,526 | Pelikan | Oct. 8, 1940 |
| 2,295,301 | Smith | Sept. 8, 1942 |
| 2,610,237 | Benner | Sept. 9, 1952 |
| 2,748,206 | Andrews | May 29, 1956 |
| 2,769,069 | Christy et al. | Oct. 30, 1956 |
| 2,816,995 | Harrington et al. | Dec. 17, 1957 |
| 2,823,271 | Wagstaff | Feb. 11, 1958 |
| 2,853,585 | Danziger et al. | Sept. 23, 1958 |